US012661931B2

(12) United States Patent
Andrews

(10) Patent No.: US 12,661,931 B2
(45) Date of Patent: Jun. 23, 2026

(54) WHEEL AND TIRE ASSEMBLY, METHOD OF MANUFACTURE AND USE THEREOF

(71) Applicant: Kenda Manufacturing GB Limited, Cheshire (GB)

(72) Inventor: Michael Andrews, Cheshire (GB)

(73) Assignee: Kenda Manufacturing GB Limited, Cheshire (GB)

( * ) Notice: Subject to any disclaimer, the term of this patent is extended or adjusted under 35 U.S.C. 154(b) by 434 days.

(21) Appl. No.: 18/025,702

(22) PCT Filed: Sep. 13, 2021

(86) PCT No.: PCT/GB2021/052371
§ 371 (c)(1),
(2) Date: Mar. 10, 2023

(87) PCT Pub. No.: WO2022/053833
PCT Pub. Date: Mar. 17, 2022

(65) Prior Publication Data
US 2023/0356547 A1 Nov. 9, 2023

(30) Foreign Application Priority Data

Sep. 11, 2020 (GB) ...................................... 2014357

(51) Int. Cl.
| | |
|---|---|
| *B60C 7/10* | (2006.01) |
| *B60B 9/26* | (2006.01) |
| *B60C 7/14* | (2006.01) |
| *B60C 7/24* | (2006.01) |

(52) U.S. Cl.
CPC ................ *B60C 7/146* (2021.08); *B60B 9/26* (2013.01); *B60C 7/105* (2013.01); *B60C 7/24* (2013.01); *B60B 2360/32* (2013.01)

(58) Field of Classification Search
CPC .... B60C 7/00; B60C 7/08; B60C 7/10; B60C 7/102; B60C 7/107; B60C 7/146; B60C 7/14; B60C 7/101; B60C 7/1015
See application file for complete search history.

(56) References Cited

U.S. PATENT DOCUMENTS

| | | | |
|---|---|---|---|
| 415,787 A | * | 11/1889 | Oliver |
| 836,302 A | | 11/1906 | Childs |
| 1,315,300 A | | 9/1919 | Griggs |

(Continued)

FOREIGN PATENT DOCUMENTS

| | | | | |
|---|---|---|---|---|
| WO | 2016/038398 A1 | 3/2016 | | |
| WO | WO-2019089726 A1 | * | 5/2019 | .............. B60C 7/18 |
| WO | 2020/110723 A1 | 6/2020 | | |

OTHER PUBLICATIONS

International Searching Authority, International Search Report, PCT/GB2021/052371, Dated Nov. 2, 2021.

(Continued)

*Primary Examiner* — Cedrick S Williams
(74) *Attorney, Agent, or Firm* — Reichel Stohry Dean LLP; Mark C. Reichel; Natalie J. Dean

(57) ABSTRACT

A wheel assembly incorporating a non-pneumatic tyre, said assembly including first inner web or rib members and one or more second outer web or rib members. The web or rib members comprise flexible or resilient material where the first inner web members are less flexible or substantially more rigid than the second outer web members.

13 Claims, 5 Drawing Sheets

(56) References Cited

U.S. PATENT DOCUMENTS

| 5,922,151 | A | * | 7/1999 | Piper ....................... B29C 70/74 |
| | | | | 301/5.304 |
| 5,979,992 | A | | 11/1999 | Calderone et al. |
| 2017/0087931 | A1 | * | 3/2017 | Gaylo ....................... B60B 3/02 |
| 2017/0113489 | A1 | * | 4/2017 | Iwamura ................... B60B 3/08 |
| 2018/0056720 | A1 | | 3/2018 | Abe |

OTHER PUBLICATIONS

International Searching Authority, Written Opnion of the International Searching Authority, PCT/GB2021/052371, Dated Nov. 2, 2021.

* cited by examiner

WHEEL AND TIRE ASSEMBLY, METHOD OF MANUFACTURE AND USE THEREOF

The present invention relates to a new wheel assembly that includes a tyre which is particularly applicable to wheels including airless or non-pneumatic tyres.

Although the following description refers to a wheel assembly incorporating polyurethane tyres the skilled person will appreciate that other airless or non-pneumatic tyre materials could be used, for example other polymers such as rubber, polyethylene, nylon and the like.

The use of airless or non-pneumatic tyres on a variety of vehicles from fork lift trucks to skateboards is known. Typically a solid tyre is fitted to a metal rim or hub which is connected to the vehicle axle. Solid airless tyres have the advantage of being able to carry a high load without significant deformation as would be the case with a similar sized pneumatic tyre. In addition, solid tyres avoid the problem of punctures or periodic reinflation that pneumatic or air filled tyres suffer from. Unfortunately, solid tyres invariably add to the weight to the vehicle and do not absorb shocks as well as conventional pneumatic tyres.

Furthermore, airless tyres have a high rolling resistance and have issues with the heat build-up that occurs in use due to frictional forces. This heat causes the tyre to expand and can disrupt the close fit required to the hub or wheel body.

It is therefore an aim of the present invention to provide a wheel and tyre assembly that addresses the abovementioned problems.

It is a further aim of the present invention to provide a method manufacturing a wheel and tyre assembly that addresses the abovementioned problems.

In a first aspect of the invention there is provided a wheel assembly or apparatus incorporating a non-pneumatic tyre, said assembly including;

first inner web or rib members and one or more second outer web or rib members, said web or rib members comprising flexible or resilient material wherein the first inner web members are less flexible or substantially more rigid than the second outer web members.

Typically the second outer web or rib members are more flexible than the inner web or rib members. As such, the relatively rigid inner webs or ribs flex on unusually and/or intermittent high loads or impacts, for example such as bumping up and/or down kerbs, or contacting unexpected objects, stones etc. The more flexible outer ribs provide potential to vary the spring rate and provides a degree of protection of the inner ribs from frequent small impacts during the course of use.

Preferably at least the web or rib members comprise a thermoplastic material. Typically the material is a thermoplastic polymer. Further typically the thermoplastic material is nylon.

In a preferred embodiment the assembly includes a band member. Typically the band member is an annular ring formed around the distal ends of the first inner web or rib members.

In one embodiment the wheel assembly includes a core means forming at least part of the wheel hub. Typically the first inner web members depend outwardly from the core means or hub.

Further typically the inner web members extend radially from the wheel hub.

In one embodiment the first inner web or rib members extend outward from the wheel hub to the band member. Typically the first inner web or rib members are non-linear in shape. Further typically the inner web members are C-shaped or preferably S-shaped.

Preferably the second outer web or rib members extend from the band member.

In one embodiment the wheel member includes first inner and second outer band members. Typically the band members are arranged in a concentric arrangement with the first inner web members extending between the inner and outer bands.

Typically the web or rib members comprise a series of resilient or flexible fingers. Preferably the web or rib members include at least one bend or curve in the region where the web member meets or attaches to a band member.

Typically the first and second web or rib members are deformable. The first inner web or rib members are less deformable or more rigid than the more deformable or more flexible outer rib or web members.

In a preferred embodiment the second outer web or rib members are smaller in length and/or diameter than the first inner web or rib members.

In one embodiment the first web or rib members are substantially the same shape and extend radially from the hub or inner band member.

In one embodiment the second web or rib members are substantially the same shape and extend radially from the band member or outer band member.

Typically the web or rib member properties may be preselected to provide a required cushioning effect to the wheel in use by selecting from web material, length, width or thickness, rib inclination or curvature between the bands.

In a preferred embodiment the outer web members or ribs are encapsulated or encased in polymeric material. Typically the polymeric material is tyre and/or tyre tread material. Further typically the encapsulation prevents the outer ribs from going beyond their elastic limit.

In one embodiment the outer surface or the band member and the second outer web or rib members are completely encapsulated by the resilient or deformable tyre material.

In a preferred embodiment the flexible, or more flexible outer ribs are encapsulated or encased with foamed polymeric material. Typically the foam is polyurethane foam. Further typically the foam forms a ring or tyre around the outside or rim of the wheel assembly. This arrangement provides; lateral stability to the foam, potential to vary the spring rate, ensures a mechanical retention of the foam to the wheel assembly and importantly the foam protects the outer ribs from going beyond their elastic limit.

This arrangement ensures that the inner webs only substantially deflect when under unusually high loads. This ensures rolling resistance is minimised, which is essential for fuel economy, thus maximising vehicle range before re-fueling/re-charging.

The outer ribs, being of a smaller, thinner construction compared to the inner webs, are therefore more flexible. These work in conjunction with the foam and outer tread material to provide subtle shock and vibration absorption without unduly affecting rolling resistance and therefore vehicle range.

In one embodiment the first and second web members are individual or discreet members.

Typically the core means includes a substantially planar plate or surface forming the hub of the wheel assembly. In use the core means is attached to the vehicle axle or to the axle via a wheel hub assembly.

Typically the web or rib members depend or extend from the core means or band member in at least one direction or angle away from the plane of the core means or band member.

In one embodiment the web or rib members depend away from the core means or band member such that an acute angle is formed between the web or rib and the core means or band member.

In a preferred embodiment the tyre or at least the tyre tread is formed from polyurethane or polyurethane based material.

In one embodiment the polymeric material can be applied in one or more layers.

In one embodiment the properties of the polymeric material layers can be different. Typically the density and/or rigidity of the polymeric material can be adjusted to provide layers of different properties.

Optionally the first inner web or rib members can be encased or encapsulated in polymeric material.

In one embodiment the polymeric material can form one or more bands around the edge or towards the outer surface, or tread, of the tyre in contact with the ground in use.

In one embodiment the polymeric material is or includes at least one ring or layer of less dense or foamed polyurethane.

Typically polymeric material forming at least part of the web or rib members and/or band members is harder or less flexible than the polymeric material coating or over moulding the same. Further typically the polymeric material forming the rib members and/or the band member is nylon.

In one embodiment at least part of the band member and/or rib members is coated with primer and/or adhesive that promotes bonding between the member and the polymeric material coating the same.

In a third aspect of the invention there is provided a wheel assembly including;

inner web or rib members and outer web or rib members, said web or rib members comprising flexible or resilient material wherein the inner web members are less flexible or substantially more rigid than the outer web members.

Preferably said inner and outer web members are separated by an annular band. Typically a non-pneumatic tyre is mounted or moulded on the band and encapsulates or encloses the outer web members.

In one embodiment the inner web or rib members are inclined in the same direction.

In one embodiment the outer web or rib members are inclined in the same direction.

Specific embodiments of the invention are now described with reference to the following figures wherein.

The present invention provides an apparatus and method for producing such an apparatus being a multi-purpose, puncture-proof wheel & tyre assembly.

The wheel can be made from many suitable materials relevant to the desired application, although the preferred assemblies are made from plastics materials, typically nylon for the wheel assembly and polyurethane for the tyre.

Figure 1A:
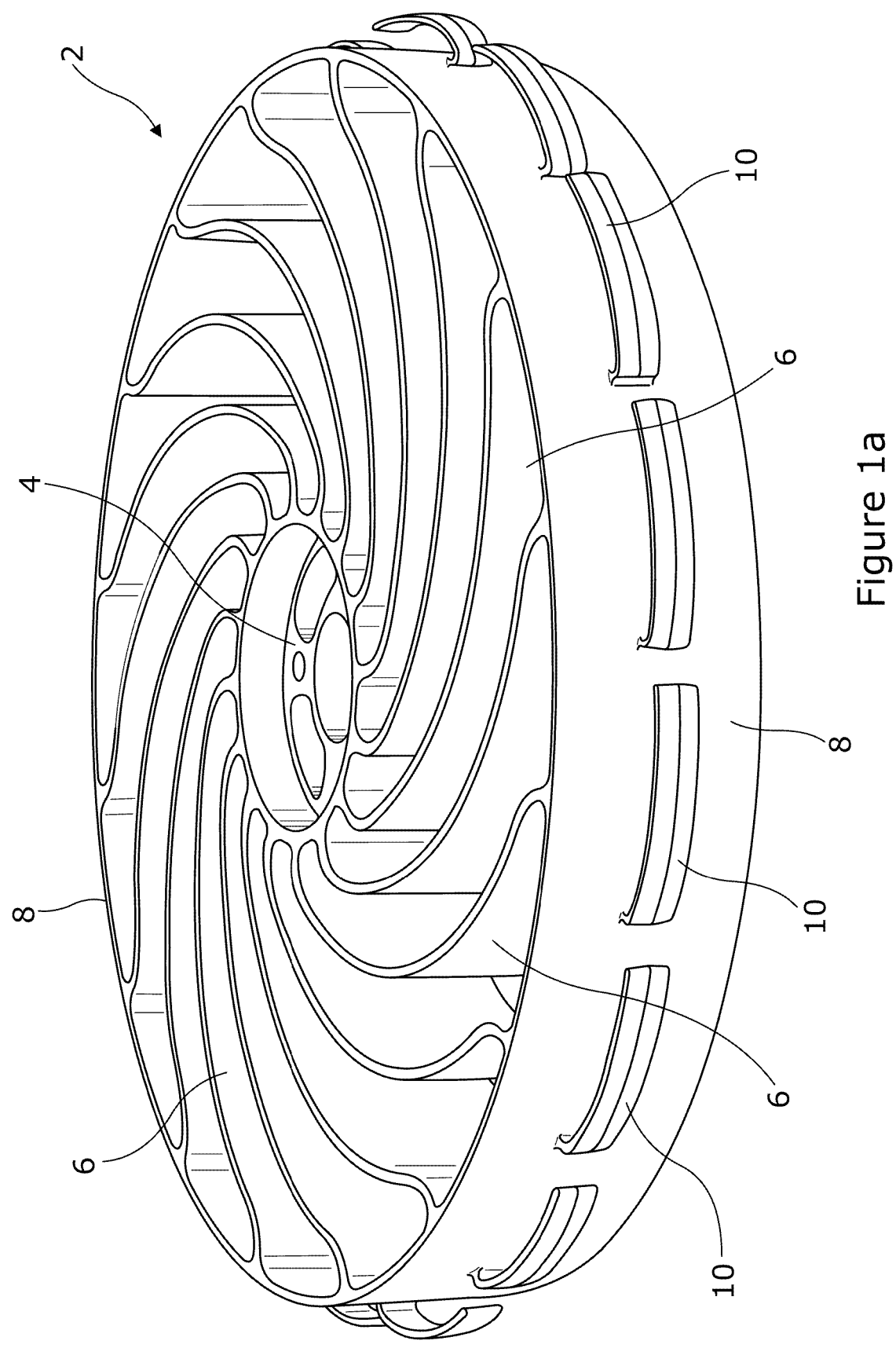
FIGS. 1a and 1b shows a wheel assembly in accordance with one embodiment of the invention.
Figure 1B:
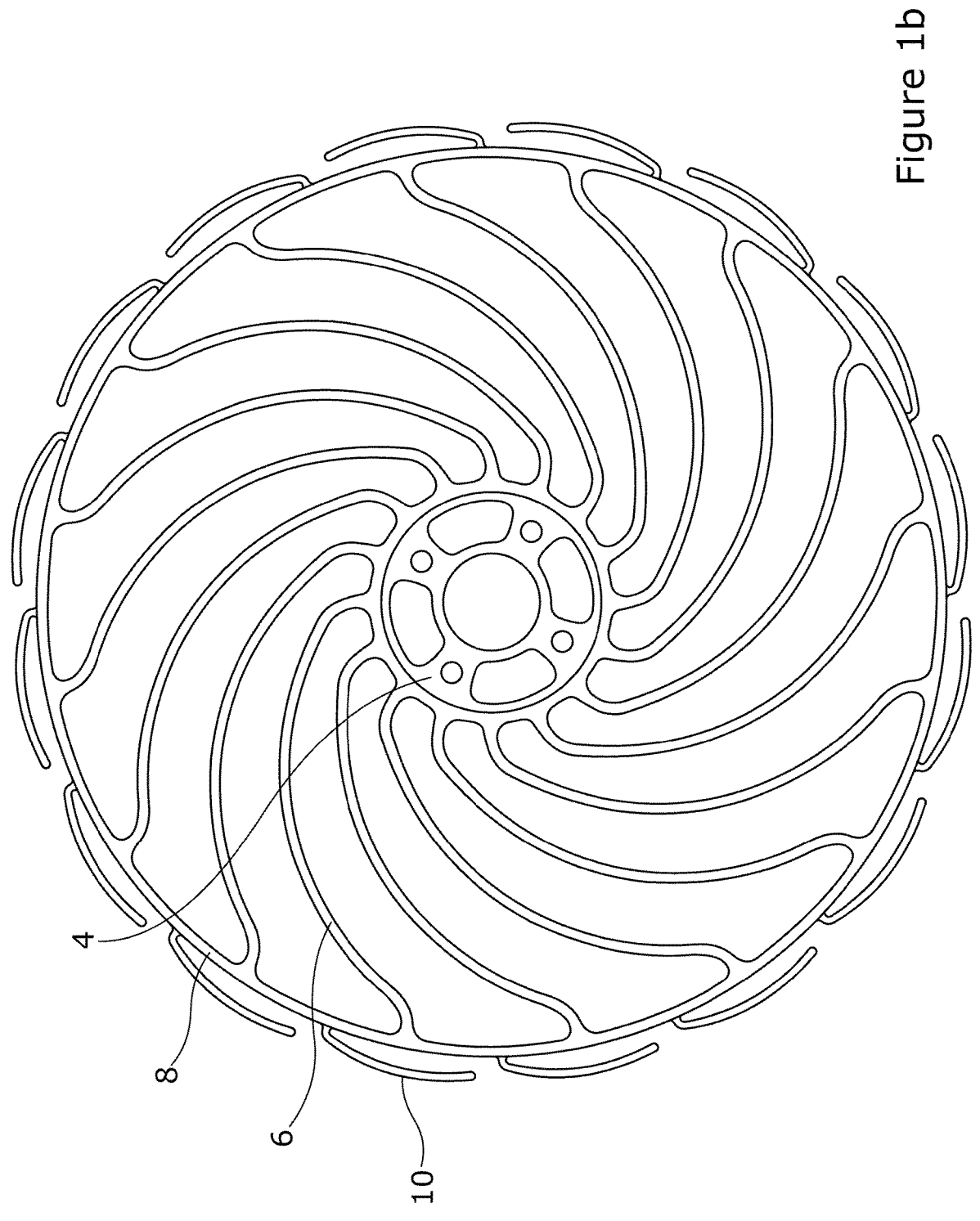

Turning to FIG. 1a which shows a wheel assembly 2 that comprises a hub 4 for attachment to a vehicle axle (not shown) and a first set of S-shaped ribs or finger members 6 extending from the hub 4 to an outer band or ring 8. The band or ring 8 has a second set of rib or finger members 10 extending outward therefrom. The wheel assembly therefore comprises inner rib members 6 and outer rib members 10.

Both sets of rib members have some flex or are deformable but importantly the outer ribs 10 are more flexible than the inner ribs 6. The outer ribs 10 are all be one direction and wider, but not joined together.

The relatively rigid inner webs are designed to be less deformable such that they would only be engaged or substantially flex on unusually and/or intermittent high loads or impacts, such as bumping up and/or down kerbs, or contacting unexpected objects, large stones etc.

Figure 2A:
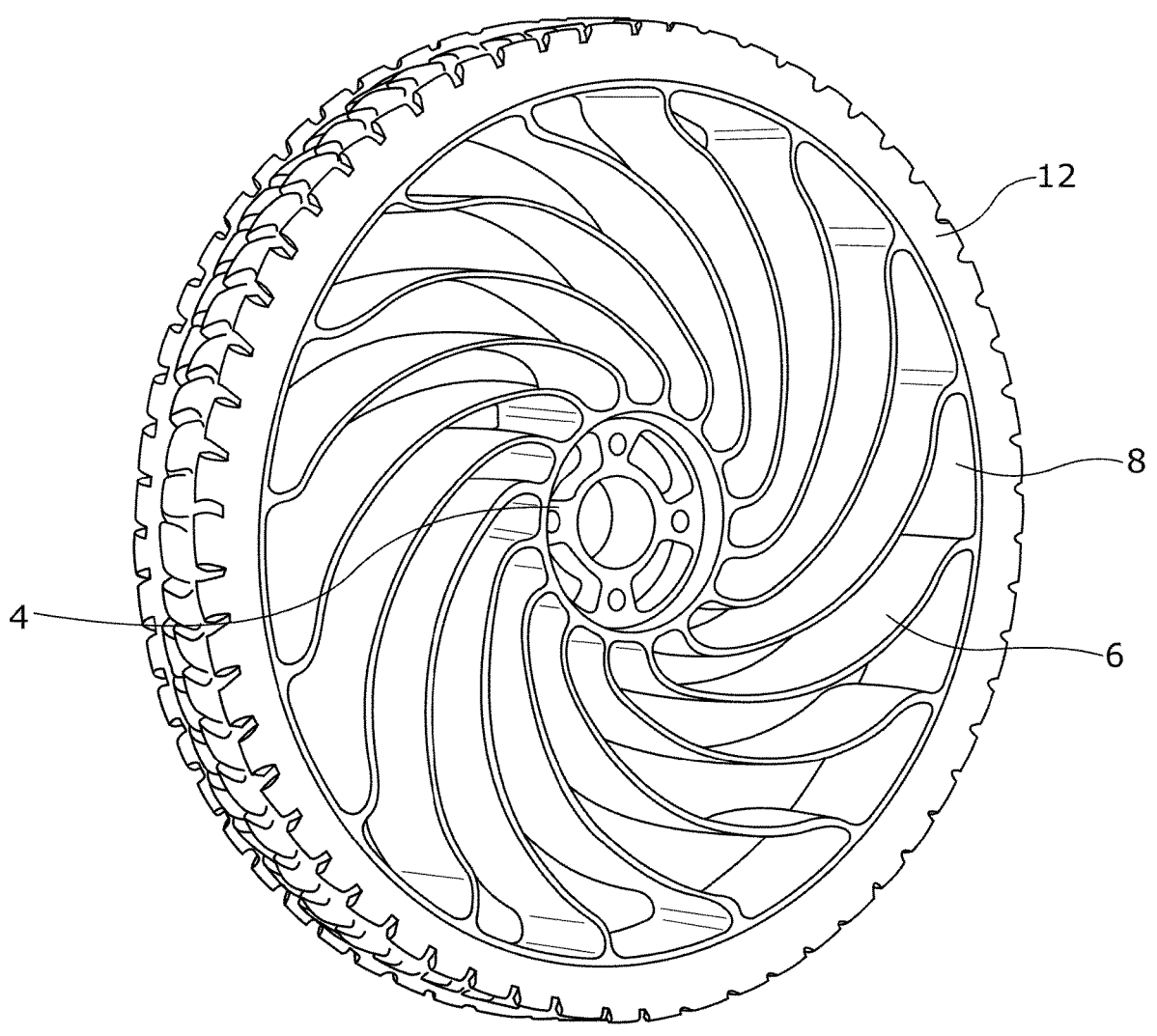
FIGS. 2a and 2b shows the wheel and tyre assembly in accordance with an embodiment of the invention.
Figure 2B:
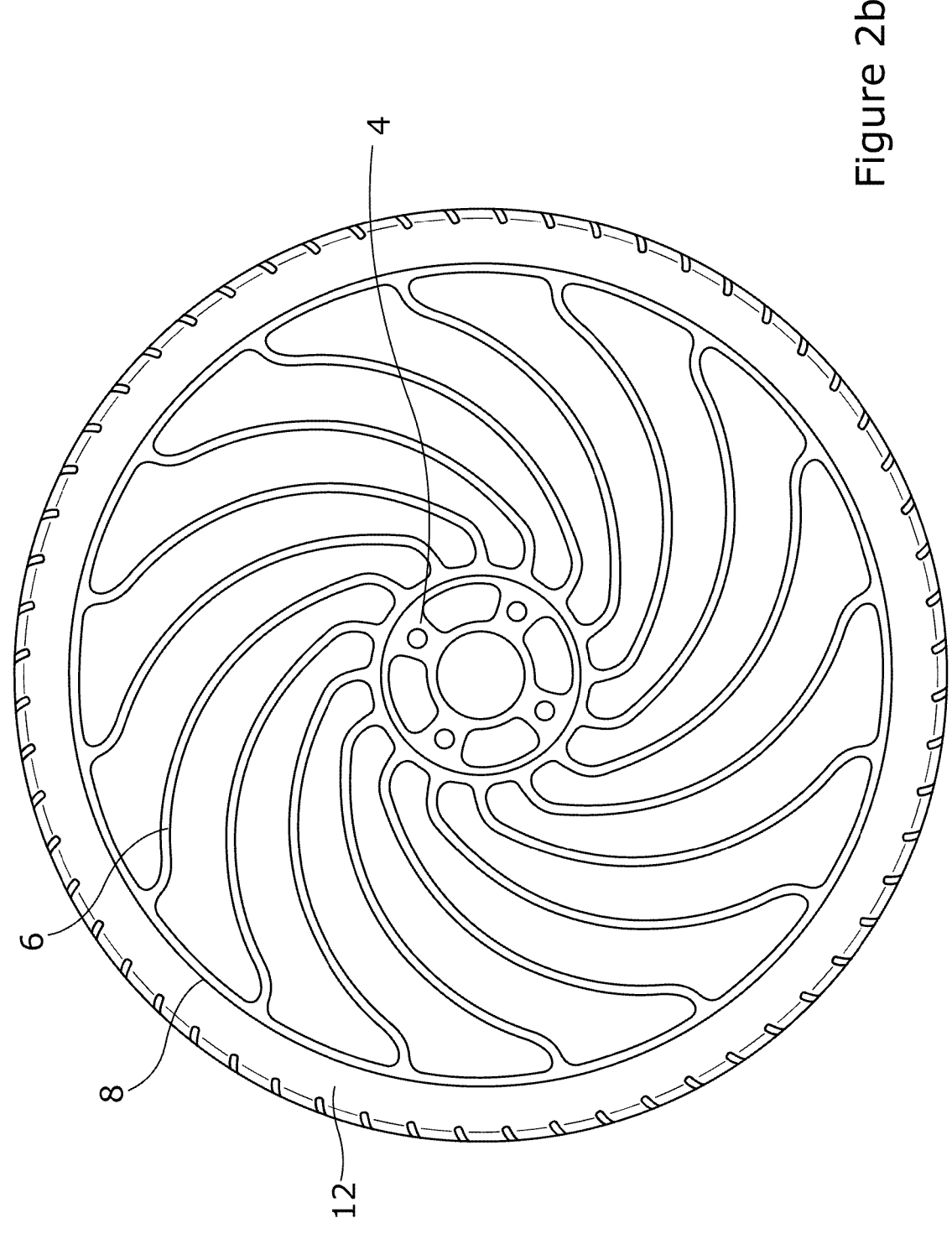

The flexible outer ribs that are encapsulated with PU foam 12, as shown in FIGS. 2a and 2b. This encapsulation or embedding gives:

lateral stability to the foam potential to vary the spring rate ensures a mechanical retention of the foam to the wheel the foam protects the outer ribs from going beyond their elastic limit Using a thermoplastic material such as nylon, for the wheel assembly 2, ensures that the inner webs only deflect when needed, for example under unusually high loads. This ensures rolling resistance is minimised, which is essential for fuel economy, usually, but not limited to electricity for this application, thus maximising vehicle range before refuelling/re-charging.

The outer ribs 10, being of a smaller, thinner construction compared to the inner ribs 6, are therefore more flexible. These work in conjunction with the foam and outer foam tread material to provide subtle shock and vibration absorption without unduly affecting rolling resistance and therefore vehicle range.

In summary therefore, the flexible outer ribs 10 for general minor shock/vibration absorption and the inner ribs 6 for high impacts. The outer rib mouldings 6 are overmoulded with PU foam 12 for two reasons:

To stop dirt ingress

To stop the webs from being damaged on a very high impact when used on demanding applications They also form a tyre for the wheel assembly.

Figure 3:
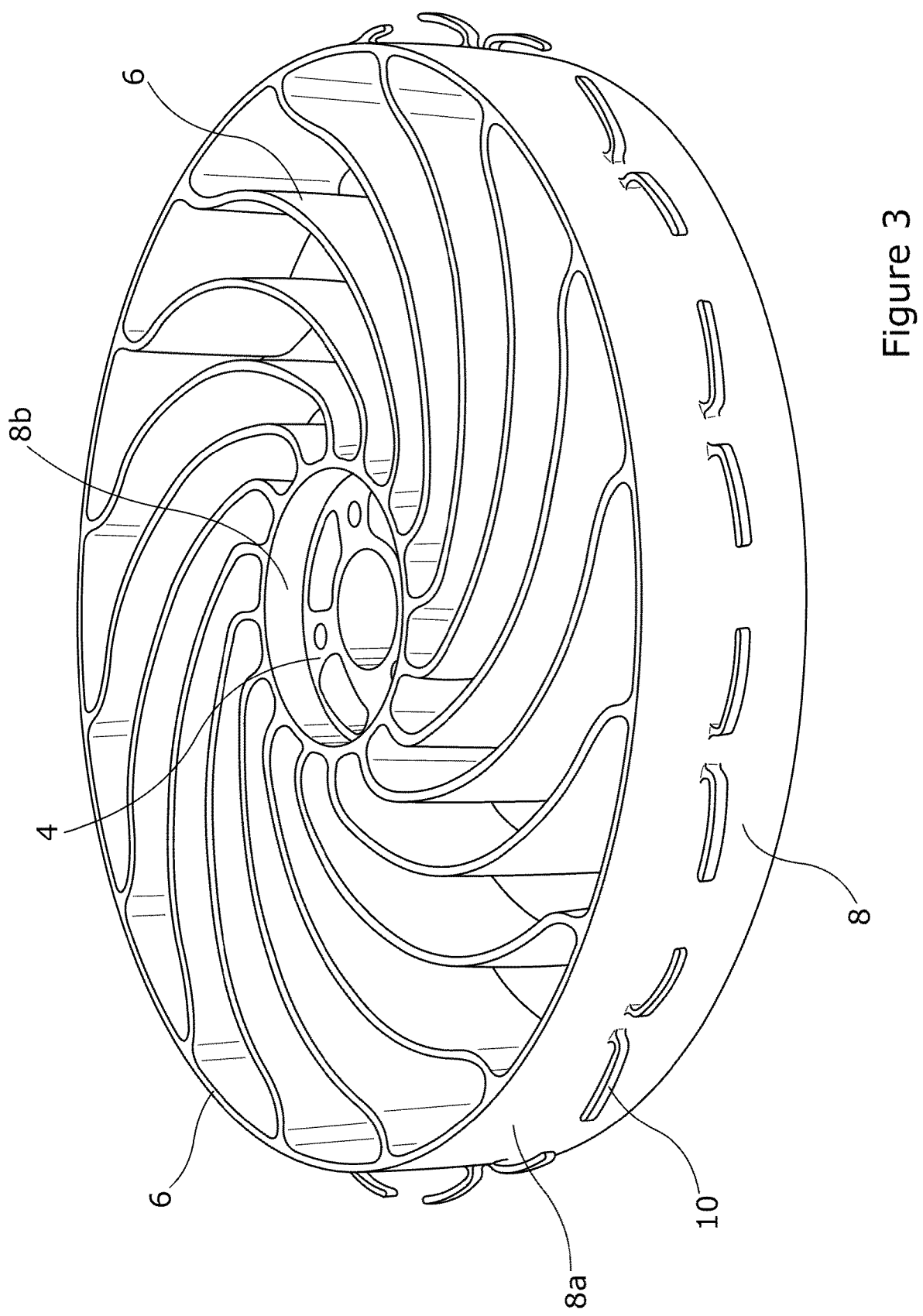
FIG. 3 shows an embodiment of a wheel assembly in accordance with one embodiment of the invention.

FIG. 3 shows an embodiment where the outer ribs 10 are paired facing in opposing directions, different to the prior example where the ribs incline or depend from the hub 4 or ring 8 in the same direction. The hub assembly 4 in this example is recessed into an inner ring 8b. The inner ribs 6 therefore extend between an inner ring 8b and an outer ring 8a.

The invention claimed is:

1. A wheel assembly incorporating a non-pneumatic tire, said assembly including;

inner web or rib members and one or more outer web or rib members;

said assembly including a core means forming at least part of a wheel hub;

an annular ring that separates the inner and outer web or rib members where the inner web or rib members are non-linear and extend from the core means to the annular ring, said inner and outer web or rib members comprising polymer material characterized in that the inner and outer web or rib members form a series of resilient or flexible fingers including at least one bend or curve in the region where the inner or outer web or rib members meets or attaches to the annular ring;

the outer web or rib members are encased in a polymeric material thereby preventing them from going beyond their elastic limit and providing protection to the inner web or rib members from frequent small impacts during the course of use; and wherein the outer web or rib members extend from the annular ring and are thinner and more flexible than the inner web or rib members to provide a degree of protection of the inner web or rib members from frequent small impacts during the course of use.

2. A wheel assembly according to claim 1 wherein the inner and outer web or rib members comprise a thermoplastic polymer.

3. A wheel assembly according to claim 1 wherein the inner web or rib members are C-shaped or S-shaped.

4. A wheel assembly according to claim 1 wherein the polymeric material is tire or tire tread material.

5. A wheel assembly according to claim 1 wherein the outer web or rib members are encased with foamed polyurethane polymeric material.

6. A wheel assembly according to claim 1 wherein the polymeric material is applied in one or more layers of different properties.

7. A wheel assembly according to claim 1, wherein an outer surface of the annular ring and the outer web or rib members are completely encased by the polymeric material.

8. A wheel assembly according to claim 1 wherein the wheel assembly includes an inner ring.

9. A wheel assembly according to claim 8 wherein the inner ring and annular ring are arranged in a concentric arrangement with the inner web or rib members extending between the inner ring and annular ring.

10. A wheel assembly according to claim 9 wherein the outer web or rib members are smaller in length or diameter than the inner web or rib members.

11. A wheel assembly according to claim 9 wherein the outer web or rib members are substantially the same shape and extend radially from the annular ring.

12. A wheel assembly according to claim 9 wherein the inner web or rib members are substantially the same shape and extend radially from the hub or inner ring.

13. A wheel assembly according to claim 12 wherein the inner web or rib members are encased or encapsulated in polymeric material.

\* \* \* \* \*